(12) United States Patent
Park et al.

(10) Patent No.: US 7,252,906 B2
(45) Date of Patent: Aug. 7, 2007

(54) POSITIVE ACTIVE MATERIAL FOR A LITHIUM SECONDARY BATTERY WITH HIGHER PERFORMANCE AND PREPARATION METHOD OF THE SAME

(75) Inventors: Hong-Kyu Park, Taejeon (KR); Yong-Hoon Kwon, Yongin (KR); Seong-Yong Park, Taejeon (KR); Mi-Seon Kwak, Taejeon (KR); Jong-Moon Yoon, Taejeon (KR); Joon-Sung Bae, Taejeon (KR); Jin-On Kim, Taejeon (KR)

(73) Assignee: LG Chem, Ltd., Seoul (KR)

( * ) Notice: Subject to any disclaimer, the term of this patent is extended or adjusted under 35 U.S.C. 154(b) by 259 days.

(21) Appl. No.: 10/240,536

(22) PCT Filed: Jan. 24, 2002

(86) PCT No.: PCT/KR02/00110

§ 371 (c)(1),
(2), (4) Date: Oct. 2, 2002

(87) PCT Pub. No.: WO02/065562

PCT Pub. Date: Aug. 22, 2002

(65) Prior Publication Data

US 2003/0148182 A1     Aug. 7, 2003

(51) Int. Cl.
*H01M 4/58*     (2006.01)
(52) U.S. Cl. .............................. 429/231.1; 429/231.3; 429/231.5; 429/231.95; 252/182.1; 427/126.3; 427/126.4; 427/126.6

(58) Field of Classification Search ............. 429/231.1, 429/223, 231.3, 231.5, 231.6, 224, 231.95; 427/126.3, 126.4, 126.6; 252/182.1
See application file for complete search history.

(56) References Cited

U.S. PATENT DOCUMENTS

| 3,251,926 A | * | 5/1966 | Click et al. ................ 403/343 |
| 5,478,674 A | | 12/1995 | Miyasaka |
| 6,492,061 B1 | * | 12/2002 | Gauthier et al. ............ 429/212 |
| 6,783,890 B2 | * | 8/2004 | Kweon et al. ........... 429/231.3 |

FOREIGN PATENT DOCUMENTS

| JP | 8-102332 A | | 4/1996 |
| JP | 9-115505 A | | 5/1997 |
| JP | 9-171813 A | | 6/1997 |
| JP | 10-172557 A | | 6/1998 |
| JP | 11-016566 | * | 1/1999 |
| JP | 11-16566 A | | 1/1999 |
| JP | 11-92119 A | | 4/1999 |
| JP | 2000-306584 A | | 11/2000 |
| WO | 99/57770 | | 11/1999 |

* cited by examiner

*Primary Examiner*—Laura Weiner
(74) *Attorney, Agent, or Firm*—Birch, Stewart, Kolasch & Birch, LLP

(57) ABSTRACT

Disclosed is a positive active material for a lithium secondary battery and a preparation method of the same that can improve cycle-life characteristics and storage characteristics at a high temperature by improving structural safety characteristics and electrochemical characteristics, by forming an overlayer comprising an oxide glass phase on the surface of the positive active material, and a lithium secondary battery comprising the positive active material.

8 Claims, 6 Drawing Sheets

POSITIVE ACTIVE MATERIAL FOR A LITHIUM SECONDARY BATTERY WITH HIGHER PERFORMANCE AND PREPARATION METHOD OF THE SAME

This application is the national phase under 35 U.S.C.§ 371 of PCT International Application No. PCT/KR02/00110 which has an International filing date of Jan. 24, 2002, which designated the United States of America.

CROSS REFERENCE TO RELATED APPLICATION

This application is based on application No. 2001-0006791 filed in the Korean Industrial Property Office on Feb. 12, 2001, the content of which is incorporated hereinto by reference.

BACKGROUND OF THE INVENTION (a) Field of the Invention

The present invention relates to a positive active material for a lithium secondary battery and a preparation method of the same, and more particularly, to a positive active material for a lithium secondary battery and a lithium secondary battery having improved storage characteristics and cycle-life characteristics at a high temperature, and improved safety characteristics, and a method of preparing the same.

(b) Description of the Related Art

A lithium secondary battery is required to have good cycle-life characteristics, safety characteristics, and storage characteristics at a high temperature. An important factor in cycle-life characteristics of a battery is the characteristics of positive and negative active materials. Recently, colossal improvements have been made in the field of negative active material, but there are still a lot of problems in the field of positive active material. Research on positive active material is particularly required, because safety and storage characteristics of a battery at a high temperature are dependant on the characteristics of the positive active material.

Representative positive active materials of a lithium secondary battery include $LiCoO_2$, $LiNiO_2$ and $LiMn_2O_4$. Among them, $LiNiO_2$ has the largest capacity but it cannot be easily utilized because of safety problem, $LiMn_2O_4$ has the smallest specific capacity and is thus not suitable for a positive active material, and $LiCoO_2$ has poor storage characteristics at a high temperature.

A lot of research is underway to overcome the above-mentioned problems. There are three representative research approaches. One of them is improving storage characteristics at a high temperature by coating $LiMn_2O_4$ with metal carbonate; another is improving cycle-life and safety characteristics by coating $LiCoO_2$ with metal oxide; the third is improving the safety of the battery by enhancing structural and thermal characteristics by the use of various dopants.

Although the above-mentioned methods improve cycle-life characteristics at room temperature, they don't improve storage characteristics and cycle-life characteristics at a high temperature.

SUMMARY OF THE INVENTION

It is an object of the present invention to provide a positive active material for a lithium secondary battery and a preparation method of the same having improved cycle-life characteristics at room temperature and at high temperature, and improved safety characteristics.

In order to achieve these objects and others, the present invention provides a positive active material for a lithium secondary battery comprising
  a) a lithium metal complex oxide described by the following Formula 1; and
  b) a glass phase overlayer of a non-crystalline oxide described by the Following formula 2 coated on the a) lithium metal complex oxide:

$$LiA_{1-x}B_xO_2 \quad \text{[Formula 1]}$$

wherein,
A is Co or Ni,
B is selected from the group consisting of Al, B, Ni, Co, Ti, Sn, Mn, and Zr; and,
x is a real number of 0~0.5, $$C_sO_t \cdot yD_zO_w \quad \text{[Formula 2]}$$

wherein,
C is selected from the group consisting of Na, K, Mg, Ba, Sr, Y, Sn, Ga, In, Th, Pb, Li, Zn, Ca, Cd, Rb, Sc, Ti, Zn, Al, Be, and Zr.
D is selected from the group consisting of Al, B, Si, Ge, P, V, As, Sb, Zr, Nb, Ti, Zn, Zr, and Pb;
y is a real number of 0.5~3; and
s and t, and z and w, are respectively variable to the oxidation number of C and D.

In addition, the present invention provides a preparation method of positive active material for a lithium secondary battery comprising the steps of:
  a) preparing lithium metal complex oxide as core particles described by Formula 1;
  b) providing an overlayer material compound described by the Formula 2;
  c) coating the lithium metal complex oxide of the a) step with the overlayer material compound of the b) step; and
  c) sintering the coated lithium metal complex oxide of c) step.

The present invention also provides a lithium secondary battery comprising the positive active material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
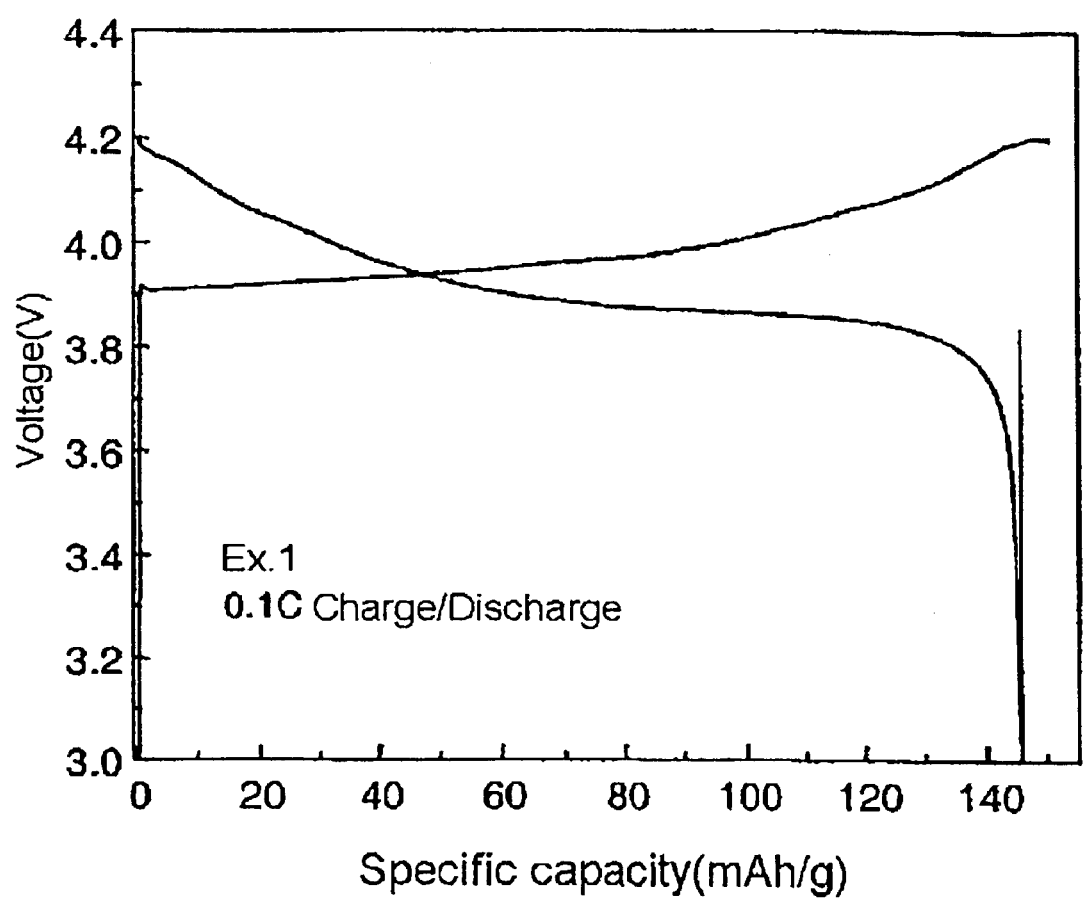
FIG. 1 is a graph showing the charge-discharge characteristics of lithium cobalt complex oxide of the core particles of Example 1 coated with an overlayer of $LiO_2.SiO_2$.

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The positive active material of the present invention comprises a) lithium metal complex compound intercalating and deintercalating lithium ions and b) an overlayer comprising an oxide glass phase having low electronic conductivity and low reactivity with electrolyte.

The lithium metal complex compound of a), in the form of core particles, are described by Formula 1.

$$LiA_{1-x}B_xO_2 \quad \text{[Formula 1]}$$

wherein,
A is Co or Ni,
B is selected from the group consisting of Al, B, Ni, Co, Ti, Sn, Mn, and Zr; and,
x is a real number of 0~0.5.

The overlayer of b) comprises a metal oxide, and is described by Formula 2.

$$C_sO_t \cdot yD_zO_w \quad \text{[Formula 2]}$$

wherein,
C is selected from the group consisting of Na, K, Mg, Ba, Sr, Y, Sn, Ga, In, Th, Pb, Li, Zn, Ca, Cd, Rb, Sc, Ti, Zn, Al, Be, and Zr.
D is selected from the group consisting of Al, B, Si, Ge, P, V, As, Sb, Zr, Nb, Ti, Zn, Zr, and Pb;
y is a real number of 0.5~3; and
s and t, and z and w, are respectively variable to the oxidation number of C and D.

The $C_sO_t$, in Formula 2 is network structure modifier oxide that makes the glass phase weak, and the $D_zO_w$ is network structure maker oxide that makes the glass phase strong. Characteristics of the overlayer oxide glass can be variable, by adjusting the ratio of network structure modifier and network structure maker. The y in Formula 2 is the ratio of $C_sO_t$ and $D_zO_w$, and the y value is preferably such that the condition of forming the glass phase occurs.

In addition, the subscripts s, and t, and z and w, are variables of the oxidation numbers of C and D, respectively. For, example if C is an element with an oxidation number of 1, $C_sO_t$ is $C_2O$; if C is an element with an oxidation number of 2, $C_sO_t$ is CO; if C is an element with an oxidation number of 4, $C_sO_t$ is $CO_2$.

Although the composition and ingredients of the glass phase of the layer can vary somewhat, it is structured to be electrochemically safe with low electronic conductivity. Therefore, the glass phase of the layer not only improves cycle-life characteristics of the battery by decreasing the electrochemical decomposition reaction of the electrolyte, but it also improves storage characteristics at a high temperature by decreasing the increase of resistance attributable to electrolyte decomposition by-products at the surface of the positive active material. In addition, the glass phase of the layer has no deformation or cleavage attributable to stress arising from crystalline anisotropy of the core particles, because the glass phase of the layer coats the core particles solidly. Therefore, the safety characteristics of the battery improve by removing defects of the surface and improving structural characteristics.

The present invention also provides a preparation method of a positive active material for a lithium secondary battery comprising the steps of a) preparing lithium metal complex oxide core particles, b) providing an overlayer material compound, c) coating the lithium metal complex oxide with the overlayer material compound of a); and d) sintering the coated lithium metal complex oxide of c).

The lithium metal complex oxide described by Formula 1 is prepared in the a) step. In particular, it is preferable that the lithium compound is selected from the group consisting of LiOH, LiOH.$H_2O$, LiCH$_3$COO, Li$_2$CO$_3$, Li$_2$SO$_4$ and LiNO$_3$; and a material that can be used as a metal in Formula 1 apart from lithium is selected from the group consisting of carbonate salt, nitrate salt, hydrate salt, acetate salt, citric acid salt, chloride and oxides of metals A and B.

The core particles of the present invention are prepared by heat treatment of the compound of lithium compound and metal compound for 1 to 20 hours, at 400 to 900° C. in air or complex air comprising over 10 vol % of oxygen.

In the b) step, a homogeneous complex solution is prepared by mixing adequate proportions of material compounds to form an oxide glass phase compound as an overlayer. It is preferable that the materials of the overlayer are selected from the group consisting of carbonate salt, nitrate salt, hydrate salt, acetate salt, citric acid salt, chloride and an oxide of metals C and D shown in Formula 2, and that the solution is prepared by agitating the materials after they are dissolved in water or alcohol.

The material of the overlayer is preferably 0.01 to 10 mol % of the core particles on the assumption that the compound forming the overlayer becomes a glass phase metal oxide after heat treatment.

The core particles of the a) step are coated with the overlayer material prepared in the b) step in the c) step, and there are two methods to do so. One is that the lithium metal complex oxide powder of the a) step is added to an aqueous solution or an organic sol solution of the material compound of the b) step, a slurry is prepared and sufficiently agitated using an agitator, and the solvent is then evaporated by heating. The complex oxide glass is coated on the lithium metal complex oxide powder after heat treatment.

The other more simple method is that the aqueous solution or organic sol solution is sprayed on the surface of the lithium metal complex oxide, and is dried. In more detail, the complex sol solution is sprayed to coat the core particles while the core particles are fluidized in the air, and coating and drying are done at the same time while controlling the temperature.

The lithium metal complex oxide powder is dried in an oven at 50 to 150° C., and it is heat treated in air or a complex gas comprising over 10 vol % of oxygen. In the above procedure the gas flow rate is 0.05 to 2.0 l/gH, and the heat treatment time is 1 to 30 hours, and preferably 5 to 15 hours.

The heat treatment time and temperature are controllable according to the purpose within the above-mentioned coverage. The surface layer can be partially hardened according to the heat treatment temperature, and some elements of the compound can be doped on the surface of the core particles during the heat treatment procedure.

The following Examples are presented to better illustrate the invention, but are not to be construed as limiting the invention to the specific embodiments disclosed.

EXAMPLE 1

Fabrication of Core Particles $Li_2CO_3$ as a lithium material and $Co_3O_4$ as a cobalt material were mixed in ethanol at a mol ratio of Li to Co of be 1.02:1. They were homogeneously pulverized and mixed for 10 hours, then dried in a drier for 12 hour. The compound was then sintered at 400° C. for 10 hours, it was repeatedly pulverized and mixed, and then heat treated at 900° C. for 10 hours in the air, resulting in the fabricated $LiCoO_2$ as the core particles.

Fabrication of Material of the Overlayer $LiOH.H_2O$ was used as a material to provide lithium as network structure modifier, and $Si(OC_2H_5)_4$ was used as a material to provide Si as network structure maker. After the quantities of network structure modifier and network structure maker were adjusted such that the equivalence ratio of Li:Si became 2.0:1.0, the compounds of $LiOH.H_2O$ and $Si(OC_2H_5)_4$ were dissolved in the an organic solvent and agitated for over 30 minutes, resulting in the homogeneous metal compound complex solution. The quantity of the compound that would form the overlayer was 1 mol % of the core particles on the assumption that the material of the compound would be converted to oxide glass after heat treatment.

Coating

After the overlayer compound and the lithium cobalt complex oxide were mixed, the core particles were coated as the mixture was as agitated, and then it was heat treated and the solvent was evaporated.

Sintering

The coated lithium cobalt complex oxide powder was heat treated at 600° C. for 5 hours in a tube-type furnace. In air, and the flow rate of the air was 0.1 l/gH.

Fabrication of Test Cell

A slurry was produced by dispersing the coated lithium cobalt complex oxide powder, 10 wt % of graphite and 5 wt % of PVDF (polyvinylidine fluoride) in an NMP (n-methyl pyrrolidone) solvent. After the slurry was coated on the Al-foil and heated, it was dried to evaporate the NMP solvent.

MCMB (Mesocarbon Microbead) was used as a negative electrode, and an electrolyte in which 1 mol of $LiPF_6$ dissolved in an EC (ethylene carbonate):EMC (ethylmethyl carbonate) compound at a volume ratio of 1:2 was used.

Test of Properties of Test Cell

Figure 2:
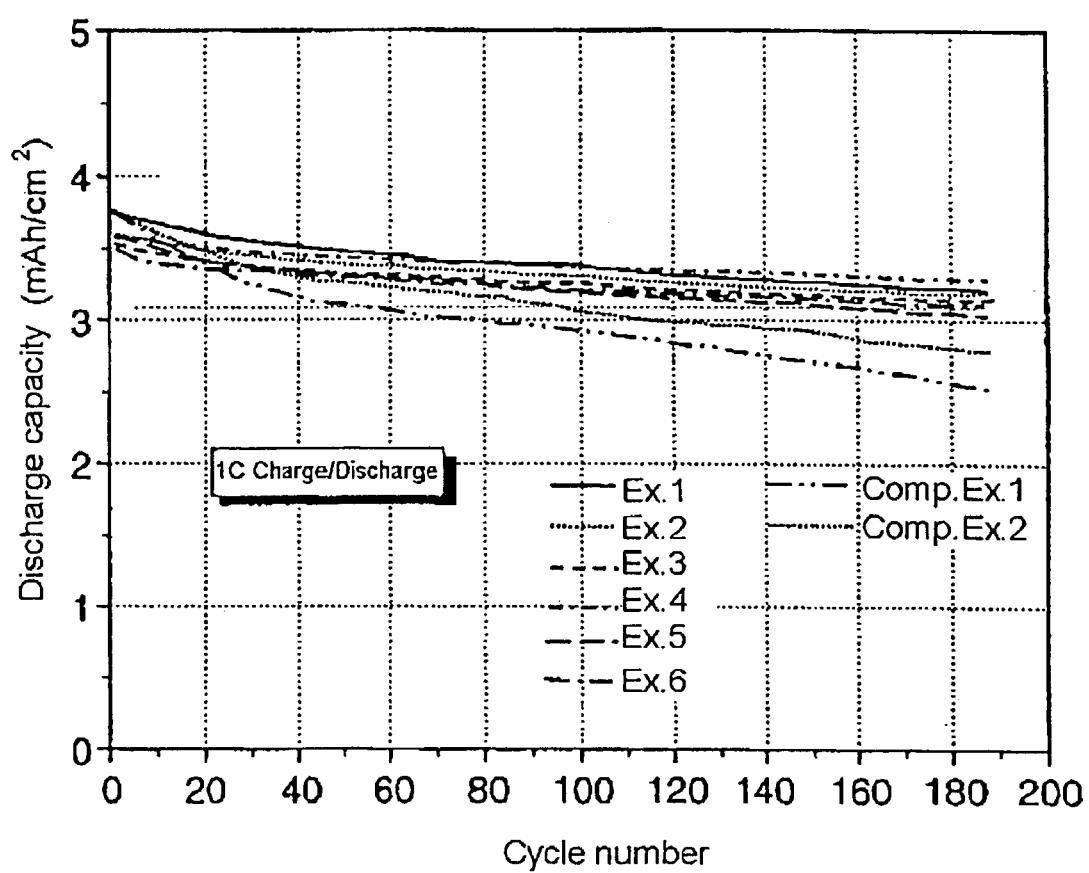
FIG. 2 is a graph showing cycle-life characteristics of Examples 1 to 6 and Comparative Examples 1 and 2.
Figure 4:
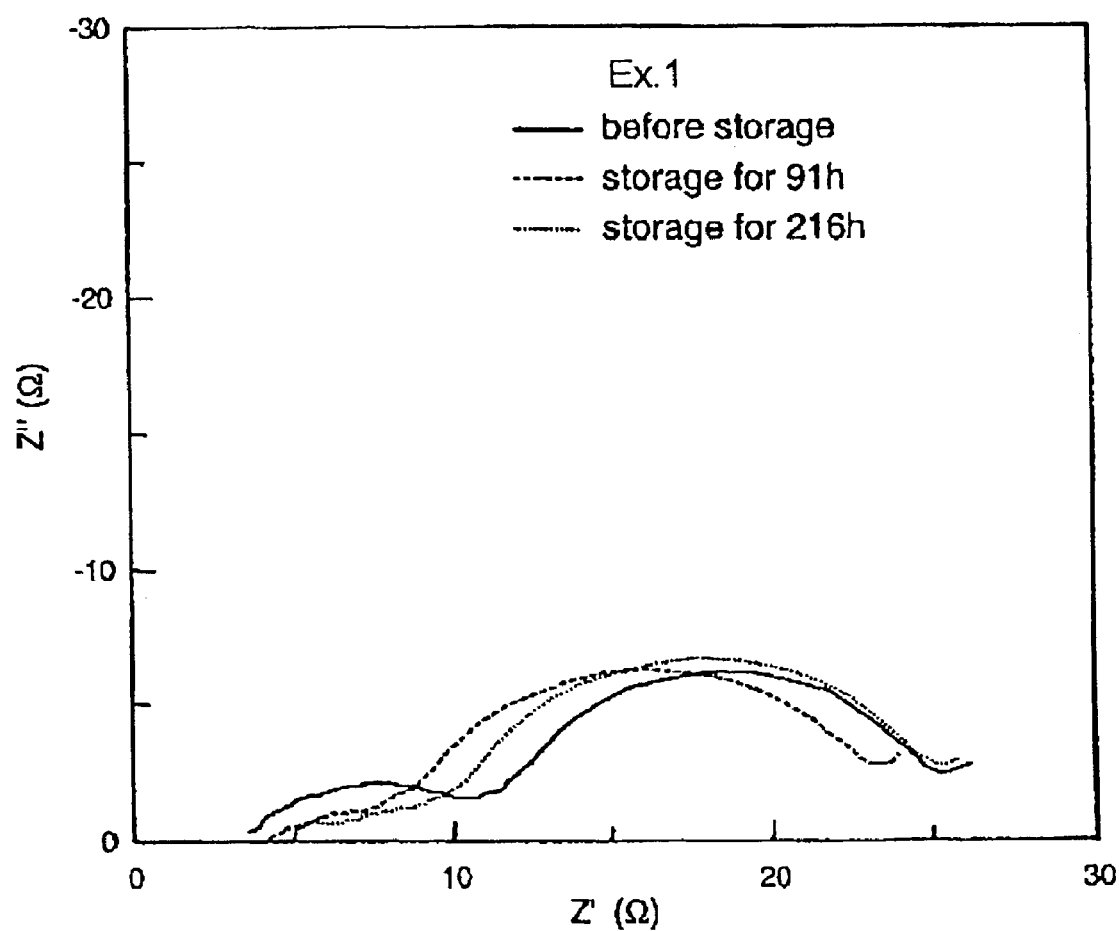
FIG. 4 is a graph showing the variation of impedance of the surface resistance of the positive active material according to storage time at 55° C. of Example 1.

A half-cell was prepared using the fabricated electrode as a positive electrode and lithium metal as a negative electrode for a test of storage characteristics at a high temperature. The charge-discharge characteristics at a charge-discharge voltage of between 3 and 4.2V are shown in FIG. 1, and the capacity variations according to cycles are shown in FIG. 2. Impedance was tested after the cell was charged and discharged for 2 cycles between 3 and 4.2V and the cell was again charged to 4.2V. Variation results of the impedance test at 0.1 to 100 KHz at 55° C. are shown in FIG. 4 and Table 1.

The impedance of a full cell was tested after the 2 charge-discharge cycles between 3 and 4.2V, and the cell was again charged to 4.2V. The impedance while the cell was charged to 4.2V at 15, 75 and 175 cycles was also tested.

Figure 6:
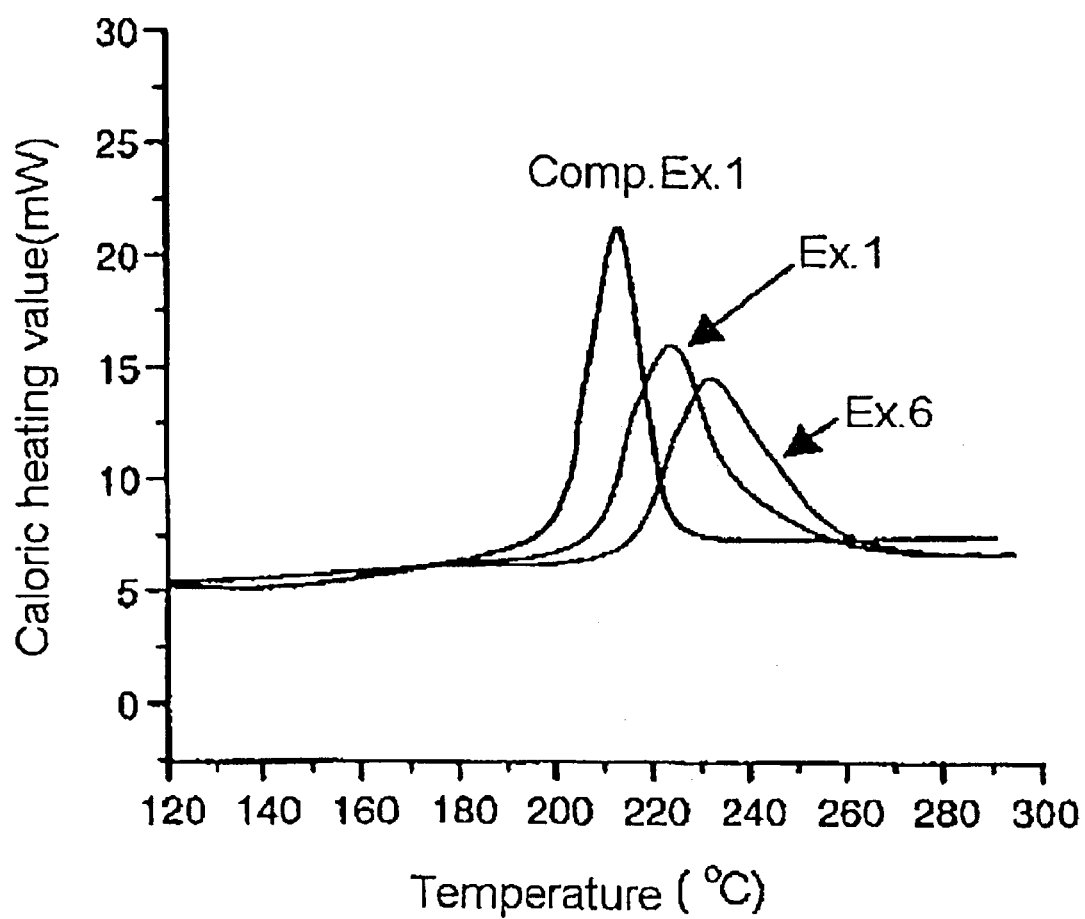
FIG. 6 is a graph showing the heat flow rate according to the temperature of the lithium cobalt complex oxide under oxygen decomposition of the batteries of Examples 1 and 6 and Comparative Example 1 after beg being charged to 4.2V, as analyzed by a Themo Gravimetry/Differential Thermal Analyzer (TG/DTA).

After the cell was charged to 4.2V and dismantled, and the electrode washed, the structural safety characteristics of the cell were tested with TG/DTA, and the results are shown in FIG. 6. The above procedure was executed in a glove box so the cell did not have to contact with the air.

EXAMPLE 2

$Li_2CO_3$ as a material of Lithium material, $Co(OH)_3$ as a cobalt material, and $Al(OH)_3$ for doping Al were dissolved in ethanol at a mol ratio of Li to Co to Al of 1.02:0.95:0.05. After the materials were dissolved, they were homogeneously pulverized with a ball mill and mixed for 12 hours, then dried in a drier for 12 hours. The compound was then, sintered at 400° C. for 10 hours, it was repeatedly pulverized and mixed, and then heat treated at 900° C. for 10 hours in the air, resulting in the fabricated $LiCo_{0.95}Al_{0.06}O_2$ as the core particles.

The positive electrode and test cell were prepared and tested by the same method as in Example 1, except that the core particles were fabricated by the above method.

EXAMPLE 3

$Li_2CO_3$ as a Lithium material, $Co(OH)_3$ as cobalt material, and $B(OH)_3$ and $SnCl_4$ for doping B and Sn were dissolved in ethanol at a mol ratio of Li to Co to B to Sn of 1.02:0.88:0.07:0.05. After the materials were dissolved, they were homogeneously pulverized with a ball mill and mixed for 12 hours, then dried in a drier for 12 hours. The compound was then sintered at 400° C. for 10 hours, it was repeatedly pulverized and mixed, and then heat treated at 900° C. for 10 hours in the air, resulting in the fabricated $LiCo_{0.88}B_{0.07}Sn_{0.05}O_2$ as the core particles.

The positive electrode and test cell were prepared and tested by the same method as in Example 1, except that the core particles were fabricated by the above method.

EXAMPLE 4

The positive electrode and test cell were prepared and tested by the same method as in Example 1, except that the lithium cobalt complex oxide as the core particles prepared in Example 2 were used, and $LiOH H_2O$ was used as a material to provide lithium as network structure modifier, and $B(OH)_3$ was used as a material to provide B as network structure maker. The quantities of network structure modifier and network structure maker were adjusted to the equivalence ratio of 1.0:1.0.

EXAMPLE 5

The positive electrode and test cell were prepared and tested by the same method as in Example 1, except that the lithium cobalt complex oxide as the core particles prepared in Example 2 was used, $LiOH H_2O$ and NaOH were used as a material to provide lithium and sodium as network structure modifier, and $Si(OC_2H_5)_4$ was used as a material to provide Si as network structure maker. The quantities of network structure modifier and network structure maker were adjusted to the equivalence ratio of 2.0:1.0.

EXAMPLE 6

The positive electrode and test cell were prepared and tested by the same method as in Example 1, except that the lithium cobalt complex oxide as the core particles prepared in Example 3 were used, $LiOH \cdot H_2O$ was used as a material to provide lithium as network structure modifier, and $Al(OH)_3$ was used as a material to provide Al as network structure maker. The quantities of network structure modifier and network structure maker were adjusted to the equivalence ratio of 1.0:1.0.

EXAMPLE 7

The positive electrode and test cell were prepared by the same method as in Example 1, except that a conventional lithium cobalt complex oxide ($LiCoO_2$; Nippon Chem. Inc.; C-10) was used as the core particles.

EXAMPLE 8

The positive electrode and test cell were prepared by the same method as in Example 2, except that a conventional lithium cobalt complex oxide ($LiCoO_2$; Nippon Chem. Inc.; C-10) was used as the core particles.

EXAMPLE 9

The positive electrode and test cell were prepared by the same method as in Example 3, except that a conventional lithium cobalt complex oxide ($LiCoO_2$; Nippon Chem. Inc.; c-10) was used as the core particles.

EXAMPLE 10

The positive electrode and test cell were prepared by the same method as in Example 1, except that the quantity of overlayer was 3 mol % of the core particles.

EXAMPLE 11

The positive electrode and test cell were prepared by the same method as in Example 1, except that a conventional lithium cobalt complex oxide ($LiCoO_2$; Nippon Chem. Inc.; C-10) was used as the core particles, and the coated particles with the same composition of the overlayer of Example 1 were heat treated at 100° C. for 10 hours in the air.

EXAMPLE 12

The positive electrode and test cell were prepared by the same method as in Example 9, except that the heat treatment was done in a complex air of $CO_2$ at 90 vol % and $O_2$ of 10 vol %.

COMPARATIVE EXAMPLE 1

The positive electrode and test cell were prepared by the same method as in Example 1, except that the core particle were not coated.

COMPARATIVE EXAMPLE 2

The positive electrode and test cell were prepared by the same method as in Example 2, except that the core particles were not coated.

COMPARATIVE EXAMPLE 3

The positive electrode and test cell were prepared by the same method as in Example 3, except that the core particles were not coated.

COMPARATIVE EXAMPLE 4

The positive electrode and test cell were prepared by the same method as in Comparative Example 1, except that a conventional lithium cobalt complex oxide ($LiCoO_2$; Nippon Chem. Inc.; C-10) was used as the core particles.

FIG. 1 is a graph showing the charge-discharge characteristics of the lithium cobalt complex oxide of the core particles of Example 1 coated with the overlayer of $LiO_2 \cdot SiO_2$.

Figure 3:
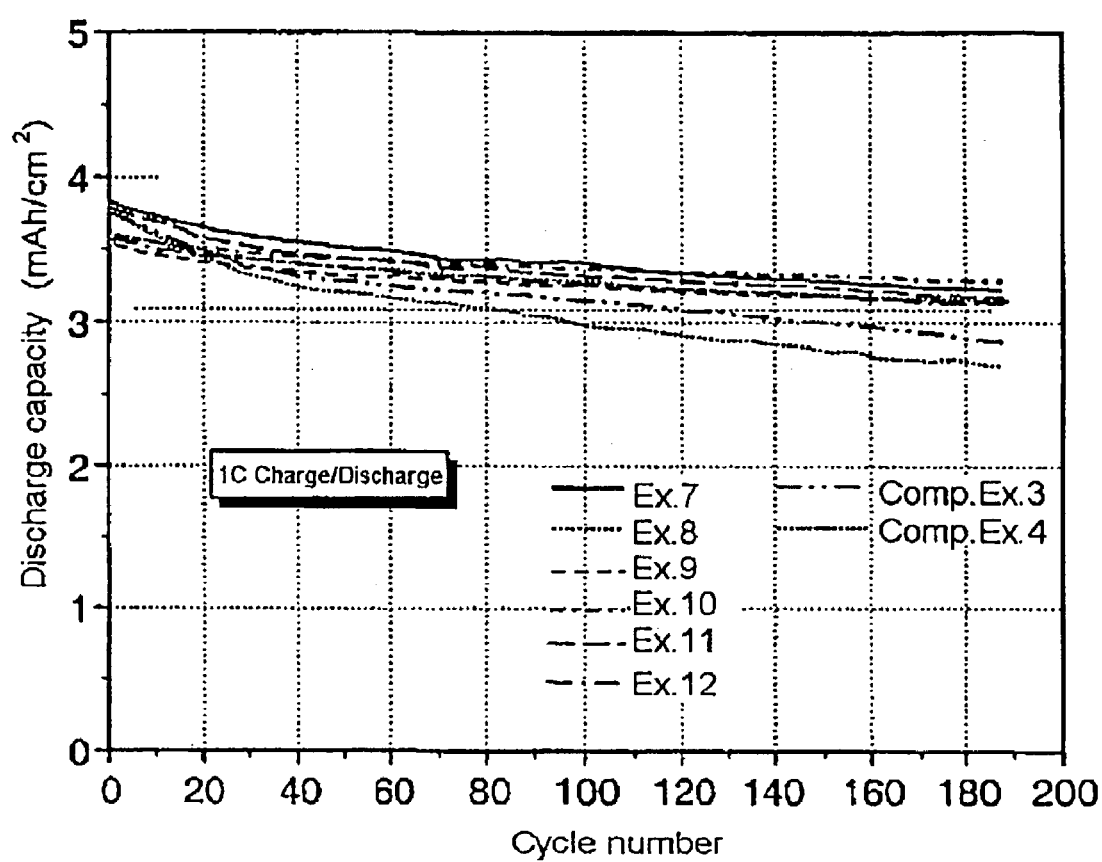
FIG. 3 is a graph showing cycle-life characteristics of Examples 7 to 12 and Comparative Examples 3 and 4.

FIG. 2 and FIG. 3 are graphs showing cycle-life characteristics of Examples and comparative Examples. The Examples having the coated core particles of the present invention shows better cycle-life characteristics than the Comparative Examples not having the core particle coated.

Figure 5:
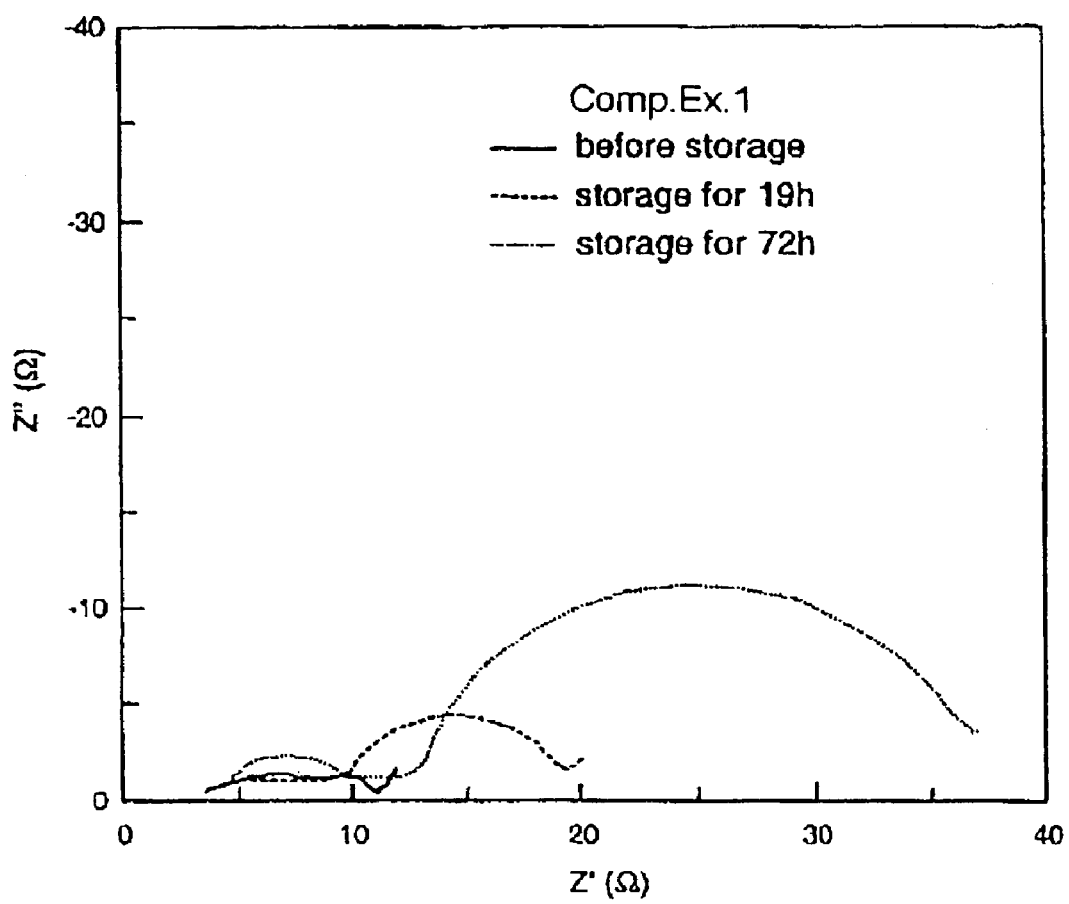
FIG. 5 is a graph showing the variation of impedance of the surface resistance of the positive active material according to storage time at 55° C. of Comparative Example 1.

FIG. 4 and FIG. 5 are graphs showing the variation of impedance of the surface resistance of the positive active material according to storage time at 55° C. In FIG. 4 and FIG. 5, the shapes of the second half of the curves are attributable to the impedance characteristics of the surface. As shown in the graphs, the initial surface impedance was a little high in the case of Example 1, but there was no substantial variation according to the storage time. But in the case of Comparative Example 1, the initial surface impedance was a little low, but there was a great variation according to the storage time. The initial surface impedance must be high for good safety characteristics of the battery, and the variation of impedance according to the storage time must be low for good cycle-life characteristics of the battery. Therefore, the battery having a coated overlayer manifests better safety characteristics and cycle-life characteristics than the battery with no coated overlayer.

FIG. 6 is a graph showing the heat flow rates according to temperature of the lithium cobalt complex oxide determined by oxygen decomposition of the batteries of Examples 1 and 6 and Comparative Example 1 after being charged to 4.2V, as analyzed with a TG/DTA. The batteries having a coated overlayer of the present invention show higher starting temperatures of heat flow and lower heat flow rates than a conventional battery not having a coated overlayer.

TABLE 1

| | Impedance according to storage time At a high temperature (Ω) | | |
|---|---|---|---|
| | Before storage | After 21 hours | After 91 hours |
| Example 1 | 13 | 15 | 17 |
| Example 2 | 15 | 17 | 20 |
| Example 3 | 13 | 18 | 25 |
| Example 4 | 15 | 20 | 28 |
| Example 5 | 14 | 21 | 29 |
| Example 6 | 13 | 19 | 32 |
| Example 7 | 12 | 17 | 22 |
| Example 8 | 12 | 18 | 24 |
| Example 9 | 12 | 17 | 24 |
| Example 10 | 20 | 22 | 25 |
| Example 11 | 13 | 21 | 33 |
| Example 12 | 12 | 16 | 26 |
| Comparative Example 1 | 5 | 28 | 80 |
| Comparative Example 2 | 7 | 19 | 36 |

TABLE 1-continued

| | Impedance according to storage time At a high temperature (Ω) | | |
|---|---|---|---|
| | Before storage | After 21 hours | After 91 hours |
| Comparative Example 3 | 5 | 20 | 45 |
| Comparative Example 4 | 5 | 30 | 84 |

The present invention has the effect of providing a positive active material for a lithium secondary battery and a method of preparing the same having improved storage and cycle-life characteristics at a high temperature and improved safety characteristics, by forming a glass phase overlayer on the surface of the positive active material.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A preparation method of positive active material for a lithium secondary battery comprising the steps of:
   a) preparing lithium metal complex oxide as core particles described by Formula 1;
   b) providing an overlayer material compound described by Formula 2 for forming a glass phase overlayer of non-crystalline oxide, which glass phase overlayer comprises $C_sO_t$ as a network structure modifier and $D_zO_w$ as a network structure maker, by dissolving:
      i) a compound selected from the group consisting of carbonate salt, nitrate salt, hydrate salt, acetate salt, citric acid salt, chloride, and an oxide of metal C described as Na, K, Mg, Sr, Ga, In, Li, Rb, and Al, and
      ii) a compound selected from the group consisting of carbonate salt, nitrate salt, hydrate salt, acetate salt, citric acid salt, chloride, and oxide of metal D described as Al, B, Si, Ge, Ti, and Pb;
   c) coating the lithium metal complex oxide of step a) with the overlayer material compound of step b), wherein said coating step is performed by making the core particles of step a) fluid in air and spraying the material of step b) on the core particles and drying the resultant material; and
   d) sintering the coated lithium metal complex oxide of step c), $$LiA_{1-x}B_xO_2 \quad [\text{Formula 1}]$$

wherein,
   A is Co or Ni;
   B is selected from the group consisting of Al, B, Ni, Co, Ti, Sn, Mn, and Zr; and
   x is a real number of 0-0.5, $$C_sO_t yD_zO_w \quad [\text{Formula 2}]$$

wherein,
   C is selected from the group consisting of Na, K, Mg, Sr, Ga, In, Li, Rb and Al;
   D is selected from the group consisting of Al, B, Si, Ge, Ti and Pb;
   y is a real number of 0.5-3; and
   s and t, and z and w are real numbers determined by an oxidation number of C and D, respectively.

2. The preparation method of claim 1, wherein the lithium metal complex oxide comprises:
   i) a lithium compound;
   ii) a compound selected from the group consisting of carbonate salt, nitrate salt, hydrate salt, acetate salt, citric acid salt, chloride, and an oxide of metal Co or Ni described as A; and
   iii) a compound comprising metal B compound is prepared by heat treating for 1 to 20 hours and at 400 to 900° C. in air or air comprising over 10 vol % of oxygen.

3. The preparation method of claim 2, wherein the lithium compound is selected from the group consisting of LiOH, LiOH.H$_2$O, LiCH$_3$COO, Li$_2$CO$_3$, Li$_2$SO$_4$ and LiNO$_3$.

4. The preparation method of claim 1, wherein the glass phase overlayer of non-crystalline oxide is 0.01 to 10 mole % of the core particles.

5. The preparation method of claim 1, wherein the sintering of step d) comprises heat treating at 300 to 900° C. for 10 minutes to 30 hours in air at a flow rate of 0.05 to 2.0 l/Gh or air having over 10 vol % of oxygen.

6. A preparation method of positive active material for a lithium secondary battery comprising the steps of:
   a) preparing lithium metal complex oxide as core particles described by Formula 1, said lithium metal complex oxide comprising:
      i) a lithium compound;
      ii) a compound selected from the group consisting of carbonate salt, nitrate salt, hydrate salt, acetate salt, citric acid salt, chloride, and an oxide of metal Co or Ni described as A; and
      iii) a compound comprising metal B compound is prepared by heat treating for 1 to 20 hours and at 400 to 900° C. in air or air comprising over 10 vol % of oxygen;
   b) providing an overlayer material compound described by Formula 2 for forming a glass phase overlayer, which glass phase overlayer comprises $C_sO_t$ as a network structure modifier and $D_zO_w$ as a network structure maker;
   c) coating the lithium metal complex oxide of step a) with the overlayer material compound of step b), wherein said coating step is performed by making the core particles of step a) fluid in air and spraying the material of step b) on the core particles and drying the resultant material; and
   d) sintering the coated lithium metal complex oxide of step c), $$LiA_{1-x}B_xO_2 \quad [\text{Formula 1}]$$

wherein,
   A is Co or Ni;
   B is selected from the group consisting of Al, B, Ni, Co, Ti, Sn, Mn, and Zr; and
   x is a real number of 0-0.5, $$C_sO_t yD_zO_w \quad [\text{Formula 2}]$$

wherein,
   C is selected from the group consisting of Na, K, Mg, Sr, Ga, In, Li, Rb and Al;
   D is selected from the group consisting of Al, B, Si, Ge, Ti and Pb;
   y is a real number of 0.5-3; and
   s and t, and z and w are real numbers determined by an oxidation number of C and D, respectively.

7. A preparation method of positive active material for a lithium secondary battery comprising the steps of:

a) preparing lithium metal complex oxide as core particles described by Formula 1;
b) providing an overlayer material compound described by Formula 2 for forming a glass phase overlayer, which glass phase overlayer comprises $C_sC_t$ as a network structure modifier and $D_zO_w$ as a network structure maker;
c) coating the lithium metal complex oxide of step a) with the overlayer material compound of step b), wherein said coating step is performed by making the core particles of step a) fluid in air and spraying the material of step b) on the core particles and drying the resultant material, and wherein the glass phase overlayer is 0.01 to 10 mole % of the core particles; and
d) sintering the coated lithium metal complex oxide of step c), $$LiA_{1-x}B_xO_2 \quad \text{[Formula 1]}$$

wherein,
A is Co or Ni;
B is selected from the group consisting of Al, B, Ni, Co, Ti, Sn, Mn, and Zr; and
x is a real number of 0-0.5, $$C_sO_t\text{-}yD_zO_w \quad \text{[Formula 2]}$$

wherein,
C is selected from the group consisting of Na, K, Mg, Sr, Ga, In, Li, Rb and Al;
D is selected from the group consisting of Al, B, Si, Ge, Ti and Pb;
y is a real number of 0.5-3; and
s and t, and z and w are real numbers determined by an oxidation number of C and D, respectively.

8. A preparation method of positive active material for a lithium secondary battery comprising the steps of:
a) preparing lithium metal complex oxide as core particles described by Formula 1;
b) providing an overlayer material compound described by Formula 2 for forming a glass phase overlayer, which glass phase overlayer comprises $C_sC_t$ as a network structure modifier and $D_zO_w$ as a network structure maker;
c) coating the lithium metal complex oxide of step a) with the overlayer material compound of step b), wherein said coating step is performed by making the core particles of step a) fluid in air and spraying the material of step b) on the core particles and drying the resultant material; and
d) sintering the coated lithium metal complex oxide of step c), wherein the sintering of step d) comprises heat treating at 300 to 900° C. for 10 minutes to 30 hours in air at a flow rate of 0.05 to 2.0 l/Gh or air having over 10 vol % of oxygen, $$LiA_{1-x}B_xO_2 \quad \text{[Formula 1]}$$

wherein,
A is Co or Ni;
B is selected from the group consisting of Al, B, Ni, Co, Ti, Sn, Mn, and Zr; and
x is a real number of 0-0.5, $$C_sO_t\text{-}yD_zO_w \quad \text{[Formula 2]}$$

wherein,
C is selected from the group consisting of Na, K, Mg, Sr, Ga, In, Li, Rb and Al;
D is selected from the group consisting of Al, B, Si, Ge, Ti and Pb;
y is a real number of 0.5-3; and
s and t, and z and w are real numbers determined by an oxidation number of C and D, respectively.

* * * * *